M. J. HOGAN.
TRACTION ENGINE.
APPLICATION FILED JAN. 9, 1907. RENEWED OCT. 18, 1913.
1,098,365.
Patented May 26, 1914.
2 SHEETS—SHEET 1.
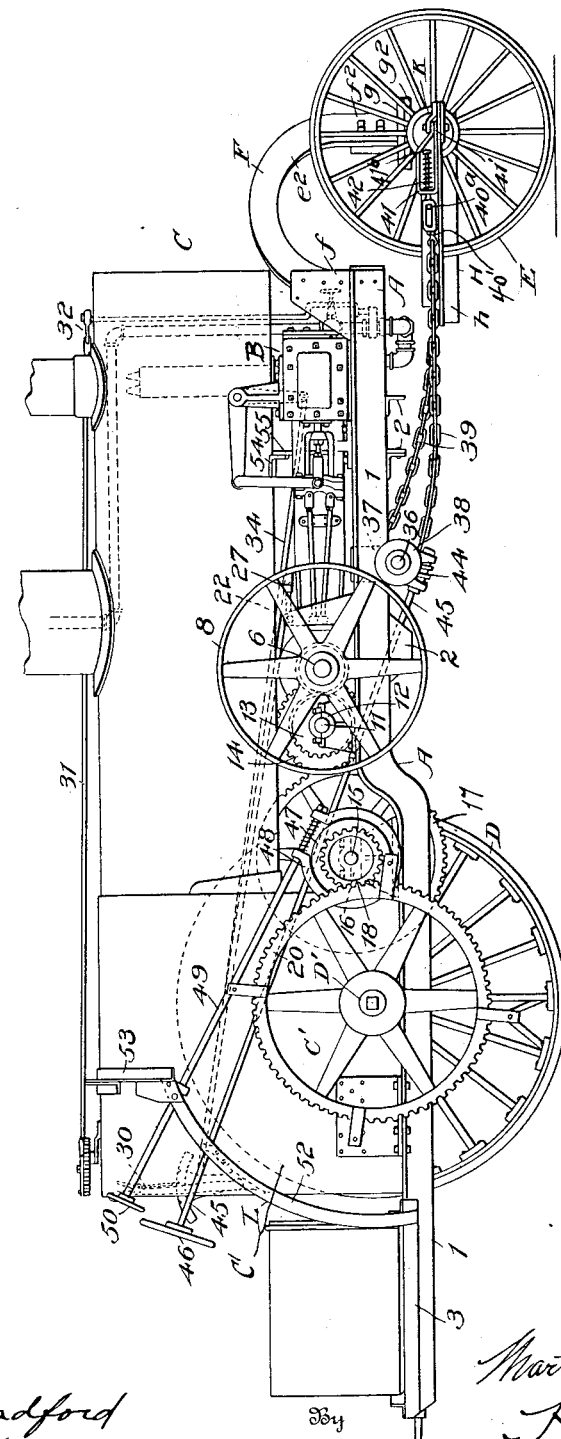

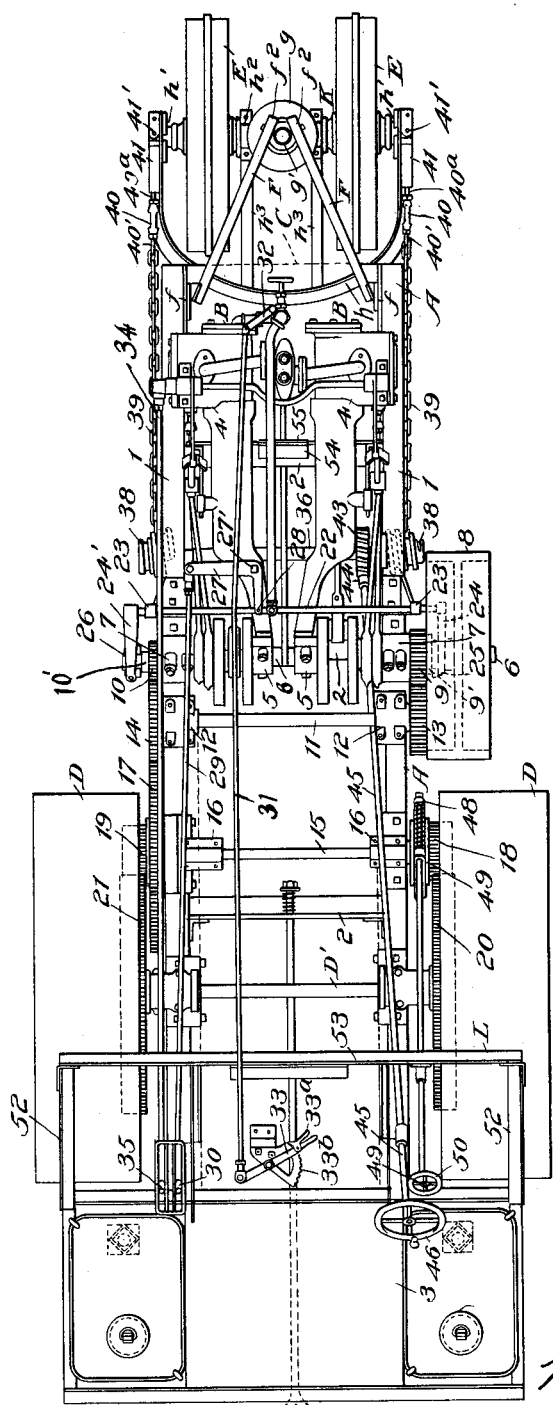

UNITED STATES PATENT OFFICE.

MARTIN J. HOGAN, OF CANTON, OHIO, ASSIGNOR, BY MESNE ASSIGNMENTS, TO AVERY COMPANY, OF PEORIA, ILLINOIS, A CORPORATION OF ILLINOIS.

TRACTION-ENGINE.

1,098,365.      Specification of Letters Patent.      Patented May 26, 1914.

Original application filed September 19, 1903, Serial No. 173,846. Renewed June 2, 1906, Serial No. 319,922. Divided and this application filed January 9, 1907, Serial No. 351,524. Renewed October 18, 1913. Serial No. 796,091.

*To all whom it may concern:*

Be it known that I, MARTIN J. HOGAN, a citizen of the United States, residing at Canton, in the county of Stark and State of Ohio, have invented certain new and useful Improvements in Traction-Engines, of which the following is a specification, reference being had therein to the accompanying drawing.

This invention relates to improvements in traction engines.

It has for its object to provide a traction engine adapted for heavy work and to so arrange the driving parts as to obtain the greatest efficiency therefrom and entirely relieve the boiler from the strains to which it is subjected when the engines or motors are secured to the shell thereof.

In various parts of the country at the present time a demand has arisen for traction motors of a high horse power. These traction engines have been mainly used for agricultural purposes, tilling the soil and driving separators, threshers and the like, but of late a demand has grown up for engines of very high power for haulage purposes at lumber camps and mines. They are often called upon to travel over very rough roads and are subjected to severe stresses which call for a rigid construction and most efficient arrangement of the working parts. The high horse power demanded from them not only requires the use of large and heavy engines, but also high steam pressure, this being found more economical in the operation of the engines. It is well known, when the engines are mounted on the boiler, that not only is the latter weakened by their weight and vibrations, but that every bolt that passes through the boiler shell decreases the boiler pressure to which it may be subjected with safety and tends to make the boiler more liable to leakage.

In my present construction I have so arranged and correlated the engines, the working parts and the boiler that the latter is not subjected to any strains from the engines or from their vibrations, and I provide a boiler which is practically boltless.

Figure 1 is a side elevation of an engine embodying my improvements, the traction wheel on the front side thereof being removed in order to show the parts behind it. Fig. 2 is a plan view of the same with the boiler shown in dotted lines.

This application is a division of my application Ser. No. 173,846, filed September 19, 1903, and renewed June 2nd, 1906, Serial No. 319,922 to which reference may be made for subject matter of invention not claimed in this application.

I do not in the present application make claim to the particular form and arrangement of the steering wheels in relation to other parts of the engine, as hereinafter set forth, inasmuch as this constitutes the subject-matter of the claims in my earlier application above referred to.

In the drawings, A indicates the framework or supporting structure for the mechanism as an entirety, B the engines, and C the boiler. The side parts of this framework, as shown, are longitudinal beams or sills 1—1. At intervals these longitudinal beams are joined by cross beams 2 which serve not only as girts, but also to support some of the operative parts of the machine.

3 is the engineer's platform secured on the rear end of the frame, as shown.

The frame is supported by the traction wheels D at the rear end and the steering wheels E at the front end thereof. The traction wheels are suitably mounted independently of each other on a rear axle D', which is rigidly secured in position on the frame.

The front end of the frame is supported on the axle of the steering wheels, preferably in the way shown in the drawings.

F—F are goose neck bars rigidly secured at $f$ to the beams 1 and extending upward and inward therefrom and curved downward at $e^2$.

$g$ is a pedestal to which the lower forward ends $f^2$ of the goose necks are secured. It also forms one part of the swivel joint or fifth wheel for the front axle, the other part of which is secured to the framework H carried by the axle K on which the steering wheels E are mounted. $g'$ is the king or swivel pin adapted to fit into the pedestal $g$ and to rotate about the axis of the pedestal. This framework H consists preferably of a curved horizontally arranged bar $h$ having secured to its ends the bearing blocks $h'$ in which the ends of the axle K are mounted.

$h^2$ is a saddle fitted about the front axle K, it being rigidly secured to the front ends of the longitudinal bars $h^3$, which at their rear ends are secured to the bar $h$. The saddle $h^2$ carries the lower part $g^2$ of the fifth wheel. It will be seen that by means of this construction I provide not only for the use of relatively large steering wheels which are adapted to turn under the frame when the engine is being turned, but also for a free use of a driving belt on the fly wheel, the steering wheels being out of the vertical planes of the fly or belt wheel. The belt is used when a thresher or other machine is to be driven by the engine.

The engines B, preferably two in number, and having their cranks at ninety degrees to each other, are arranged at the front of the framework and have their cylinders 4 rigidly secured to the beams 1 and the foremost cross beam 2. The engine frames or beds extend rearwardly and carry crank shaft bearings 5 secured to a cross beam 2 near the center of the framework. 6 is the crank shaft mounted in said central bearings 5 on the engine frame and having its ends mounted in bearings 7—7 secured to the longitudinal beams 1 one on each side of the frame.

8 is a fly wheel and belt wheel keyed to the crank shaft.

I employ a power transmitting mechanism by means of which power at two different speeds may be imparted to the driving wheels. A variable speed device is of great importance, especially when the engine is called upon to do extremely heavy work in haulage or to get itself out of a rut or bit of bad road.

9 and 10 are pinions loosely mounted on the crank shaft 6. Each of these carries on its outer face one element 9' or 10', respectively, of a clutch, the other elements of which will be hereinafter described.

11 is an intermediate shaft mounted in bearings 12—12 secured to the beams 1. This shaft carries at its opposite ends the gears 13 and 14, the former of which meshes with the pinion 9 and the latter of which meshes with the pinion 10.

15 is a countershaft having its axis of rotation in a horizontal plane somewhat below the horizontal plane of the axis of the shafts 6 and 11. This shaft 15 is mounted in bearings 16 likewise secured to the beams 1. It has a compensating gear at 17 which, being of a common or of any preferred form, need not be described. The master wheel of the compensating gear meshes with the gear 14 on the countershaft 11. At the end of this second countershaft or compensating gear shaft 15 are the driving pinions or bull pinions 18 and 19, each being loose as to the other and each driven by one of the elements of the compensating gear. The pinion 18 meshes with the driving gear or bull gear 20 and the other with the gear 21. These gears are rigid with their ground wheels, respectively, the latter being mounted independently of each other to provide for compensation.

22 is a longitudinally movable bar or rod transversely mounted in bearings 23 secured to the beams 1. This rod carries at its ends the arms or forks 24—24', of which the former engages with the clutch jaw 25, and the latter of which engages the clutch jaw 26, both of the latter being splined to the crank shaft 6.

27 is a bell crank lever pivotally secured at 27' to one of the engine frames or beds and having one of its arms pivoted at 28 to the rod 22, the other arm being pivoted to the rod 29 which extends rearward and is connected to a hand lever 30 mounted at one side of the engineer's platform. It will be seen that when this hand lever is thrown forward the rod 27 is shifted and brings into engagement the clutch jaws 25 and 9', so that the power from the crank shaft is transmitted through the pinion 9, gear 13 and gear 14, and thence to the ground wheels. This will cause the mechanism to advance at its higher speed. Drawing the arm 30 rearward causes the engagement of the clutch jaw 26 with the clutch jaw 10' on the pinion 10, which provides for the transmission of power at the slower speed.

When it is desired to use the engine merely for developing power for operating some other mechanism, the fly wheel is belted to the driving wheel of the other mechanism, and the hand lever 30 is thrown to its midway position, at which point both clutch jaws 25 and 26 are out of engagement.

To control the steam I provide a rod 31 connected at its outer end with a lever arm 32 which is adapted to operate a throttle valve in the steam supply pipe. The inner end of this rod is provided near the engineer's platform with an ordinary form of hand lever 33 having the pawl 33$^a$ adapted to engage with the segment rack 33$^b$. At 34 is a rod which extends longitudinally of the engine and has its front end connected to the train of devices for shifting the valve gear to reverse the engines. At its rear end this rod is provided with a hand lever 35 operable from the engineer's platform.

The steering device is constructed as follows: 36 is a shaft mounted in bearings 37 secured to the beams 1. At its ends this shaft carries the winding drums 38. The chains 39 have their rear ends secured to the drums and their forward ends are secured to the eye bolts 40' of a turn buckle 40. 41 is a loop or rectangle of metal pivoted at 41' to the bar $h$ of the frame H. The bolt 40$^a$ of the turn buckle projects through the rear end wall of this loop. 42 is a spring surrounding the bolt 40$^a$ within the loop and adapted to exert pressure against the end wall of the loop and against the nut 41<sup>b</sup> on the bolt.

The shaft 36 has rigidly secured to it the worm wheel 43 which meshes with the worm 44 on the steering rod 45. This rod extends rearward and is provided with a hand wheel 46 operable from the engineer's platform.

47 is a brake wheel or drum rigidly secured to the shaft 15.

48 is a brake band on the drum provided with an operating rod 49 and having the hand wheel 50 which is operable from the engineer's platform. The bearings for the rear ends of the steering rod 45, the brake rod 49, the rod for shifting the eccentrics, and the rod for operating the speed gear clutches, are supported by a supplemental frame indicated as an entirety by L. This frame consists of the upwardly extending bars 52 secured to the framework of the platform 3. At their upper ends bars 52 are secured to a transversely extending bar 53. This frame also serves to support the canopy structure for the engine.

The fire box C' of the boiler C rests upon the longitudinal beams 1 and is rigidly secured thereto in any suitable manner. I have shown it rigidly secured to the beams 1 of the frame. The front end C of the boiler is supported on and secured to the cross beam or bar 54 which is in turn supported by the standard 55 rigidly secured to one of the transverse beams or bars 2.

The parts of a traction engine of my improved construction can be rapidly and accurately assembled. It is well known that where the engines and shafting and gearing are mounted on the boilers, considerable difficulty is experienced in properly alining the numerous parts, owing to the curvature of the boiler. But in the present construction the engines can be quickly and accurately positioned on the frame entirely irrespective of the boiler.

The engines and the small movable parts immediately connected therewith are so arranged that access to the latter (the cross heads, connecting rods, eccentrics, eccentric rods, eccentric reversing gear, etc.) can be readily had at any time, and, as is well known, it is frequently necessary with traction engines to have such access to these parts in order to cleanse and repair them and keep them in proper adjustment. The steam chests and valve boxes are on the outersides of the cylinders and thus they are also exposed and readily accessible. The two cranks are at or comparatively near the center of the crank shaft, the gearing parts being arranged outside of these and near the ends of the shaft. And, as above explained, the boiler is boltless and is relieved entirely of the strains and stresses arising from the thrusts and reactions of the engines and those arising from the vibrations of the traction mechanism; the engines, the shafts, the gearing, and the bearings for the operating rods and levers being all supported on the main frame entirely independently of the boiler.

What I claim is:

1. In a traction engine, the combination of a boiler, a frame upon which the boiler rests, traction wheels supporting said frame at its rear end, steering wheels supporting said frame at its front end, engines supported upon the frame below and independently of the boiler, and arranged one at either side of the front end of said frame, a crank shaft for said engines mounted upon the said frame below the boiler, a countershaft with compensating gearing and mounted upon the said frame and geared to the traction wheels, and an intermediate shaft interposed between the countershaft aforesaid and the crank shaft and provided with two sets of speed gears, said intermediate shaft being mounted upon the frame independently of the boiler, substantially as set forth.

2. In a traction engine, the combination of a boiler, a frame supporting the boiler, traction wheels supporting one end of said frame, steering wheels supporting the other end of said frame, a crank shaft mounted on the said frame independently of the boiler, engines secured to said frame below and independently of said boiler and on the opposite sides of the crank shaft from said traction wheels and each connected to the crank shaft near the center thereof, said engines being arranged to have their guides and valve mechanisms turned outward, gearing at one end of the crank shaft, a countershaft with compensating gearing and gearing connected to the traction wheels, and power transmitting devices between the gearing on the crank shaft and the countershaft having the compensating gearing, substantially as set forth.

3. In a traction engine, the combination of a boiler, a frame upon which the boiler is mounted, engines mounted upon the frame below and independently of the boiler, traction wheels, a crank shaft for the engine mounted upon the frame, a fly or belt wheel on said crank shaft at one side of said frame, a countershaft geared to the traction wheels, a compensating gearing on the countershaft, an intermediate shaft between the crank shaft and the countershaft, double speeded power transmitting devices interposed between the crank shaft and the intermediate shaft and said compensating gearing, steering wheels, steering mechanism for adjusting said wheels mounted on the frame independently of the boiler, and means mounted on the frame independently of the boiler for throwing into and out of action the differently speeded power transmitting devices, substantially as set forth.

4. In a traction engine, the combination of a boiler, a rigid frame below the boiler upon which it is supported, a prime mover supported upon said frame independently of the boiler, a crank shaft for the prime mover transversely mounted upon said frame independently of said boiler, traction wheels, a countershaft geared to the traction wheels and mounted upon the said frame independently of the boiler, a compensating gearing upon the countershaft, an intermediate shaft, devices connecting the intermediate shaft to the compensating gearing, high and low speed gearing interposed between said crank shaft and said intermediate shaft, and oppositely acting clutches for alternately throwing into and out of operation said high and low speed mechanism.

5. In a traction engine, the combination of a boiler, a rigid frame supporting the boiler, traction wheels supporting said frame at one end, steering wheels supporting said frame at the other end, engines, each secured to said frame at one side of the front end thereof and below and independently of said boiler, a common crank shaft for the engines mounted on said frame independently of the boiler and between the engines and the traction wheels, a fly wheel or belt wheel secured to one end of said crank shaft and arranged at one side of said frame, a countershaft geared to said traction wheels, a compensating gearing on said countershaft, an intermediate shaft geared to said compensating gear, means for transmitting power at a relatively low speed from said crank shaft to said intermediate shaft arranged at one end of said crank shaft, means arranged at the other end of said crank shaft for transmitting power therefrom at a relatively high speed to said intermediate shaft, and means for throwing into and out of action the said differently speeded power transmitting devices, substantially as set forth.

6. In a traction engine, the combination of a boiler, a frame upon which the boiler rests, traction wheels supporting said frame at its rear end, steering wheels supporting said frame at its front end, engines supported upon the frame below and independently of the boiler and arranged one at each side of the front end of said frame, a crank shaft for said engines mounted upon the said frame below the boiler, and transmission gearing between said crank shaft and the traction wheels comprising a countershaft mounted upon the said frame and geared to the traction wheels, an intermediate shaft interposed between the countershaft and the crank shaft and provided with two sets of speed gears, said intermediate shaft being mounted upon the frame independently of the boiler, and a compensating gearing interposed in the gearing between the intermediate shaft and the traction wheels, substantially as set forth.

7. In a traction engine, the combination of a boiler, a frame supporting the boiler, traction wheels supporting one end of said frame, steering wheels supporting the other end of said frame, a crank shaft mounted on the frame independently of the boiler, engines secured to the frame below and independently of the boiler and on the opposite side of the crank shaft from said traction wheels and each connected to the crank shaft near the center thereof, said engines being arranged to have their guides and valve mechanism turned outward, gearing at one end of the crank shaft, and transmission gearing between said crank shaft gearing and the traction wheels comprising a countershaft geared to said wheels and a compensating gearing, substantially as set forth.

8. In a traction engine, the combination of a boiler, a frame upon which the boiler is mounted, engines mounted upon the frame below and independently of the boiler, traction wheels, a crank shaft for the engine mounted upon the frame, a fly or belt wheel on said crank shaft at one side of the said frame, transmission gearing between the crank shaft and traction wheels comprising a countershaft geared to said wheels, an intermediate shaft between the crank shaft and the countershaft, double speeded power transmitting devices interposed between the crank shaft and the intermediate shaft, and a compensating gearing interposed in the gearing between the intermediate shaft and the traction wheels, steering wheels, steering mechanism for adjusting said wheels mounted on the frame independently of the boiler, and means mounted on the frame independently of the boiler for throwing into and out of action the differently speeded power transmitting devices, substantially as set forth.

9. In a traction engine, the combination of a boiler, a rigid frame below the boiler upon which it is supported, a prime mover supported upon the frame independently of the boiler, a crank shaft for the prime mover transversely mounted upon said frame independently of said boiler, traction wheels, power transmission gearing between the crank shaft and the traction wheels comprising a countershaft geared to said wheels and mounted upon the frame independently of the boiler, an intermediate shaft between the countershaft and the crank shaft and geared to said countershaft, high and low speed gearing interposed between the crank shaft and said intermediate shaft, oppositely acting clutch devices for alternately throwing into and out of operation said high and low speed mechanism, and compensating gearing interposed between the intermediate shaft and the traction wheels, substantially as set forth.

10. In a traction engine, the combination of a boiler, a rigid frame supporting the boiler, traction wheels supporting said frame at one end, steering wheels supporting the frame at the other end, engines, each secured to said frame at one side of the front end thereof and below and independently of said boiler, a common crank shaft for the engines mounted on said frame independently of the boiler and between the engines and the traction wheels, a fly wheel or belt wheel secured to one end of said crank shaft and arranged at one side of said frame, and transmission gearing between the crank shaft and the traction wheels comprising a countershaft geared to said wheels, an intermediate shaft between the countershaft and crank shaft and geared to the former, means for transmitting power at a relatively low speed from said crank shaft to said intermediate shaft arranged at one end of said crank shaft, means arranged at the other end of said crank shaft for transmitting power therefrom at a relatively high speed to said intermediate shaft, means for throwing into and out of action the said differently speeded power transmitting devices, and a compensating gearing interposed in the gearing between the intermediate shaft and the traction wheels, substantially as set forth.

In testimony whereof I affix my signature, in presence of two witnesses.

MARTIN J. HOGAN.

Witnesses:
N. CURTIS LAMMOND,
EDWARD R. ALEXANDER.

---

Copies of this patent may be obtained for five cents each, by addressing the " Commissioner of Patents, Washington, D. C."

It is hereby certified that in Letters Patent No. 1,098,365, granted May 26, 1914, upon the application of Martin J. Hogan, of Canton, Ohio, for an improvement in "Traction-Engines," an error appears in the printed specification requiring correction as follows: Page 3, strike out line 83, and insert the words *shaft provided with compensating gearing;* and that the said Letters Patent should be read with this correction therein that the same may conform to the record of the case in the Patent Office.

Signed and sealed this 16th day of June, A. D., 1914.

[SEAL.]

J. T. NEWTON,
*Acting Commissioner of Patents.*